United States Patent
Marchand et al.

(10) Patent No.: US 7,279,808 B2
(45) Date of Patent: Oct. 9, 2007

(54) DC VOLTAGE CONVERTER WITH SEVERAL ISOLATED REGULATED OUTPUTS

(75) Inventors: Philippe Marchand, Vitre (FR); Didier Ploquin, Parthenay de Bretagne (FR); Gérard Morizot, Voiron (FR)

(73) Assignee: Thomson Licensing, Boulogne, Billancourt (FR)

( * ) Notice: Subject to any disclaimer, the term of this patent is extended or adjusted under 35 U.S.C. 154(b) by 47 days.

(21) Appl. No.: 11/393,476

(22) Filed: Mar. 30, 2006

(65) Prior Publication Data

US 2006/0220591 A1   Oct. 5, 2006

(30) Foreign Application Priority Data

Apr. 4, 2005 (FR) .................................. 05 50874

(51) Int. Cl.
*H02J 1/00* (2006.01)
(52) U.S. Cl. ...................................................... 307/31
(58) Field of Classification Search .................. 307/31, 307/32, 35
See application file for complete search history.

(56) References Cited

U.S. PATENT DOCUMENTS

| | | |
|---|---|---|
| 5,777,859 A | 7/1998 | Raets |
| 5,925,278 A * | 7/1999 | Hirst ............................ 307/31 |
| 5,991,168 A | 11/1999 | Farrington et al. |
| 2001/0036087 A1 | 11/2001 | Raets et al. |

OTHER PUBLICATIONS

Search Report Dated Jan. 2, 2006.

* cited by examiner

*Primary Examiner*—Shawn Riley
(74) *Attorney, Agent, or Firm*—Joseph J. Laks; Robert D. Shedd; William A. Lagoni

(57) ABSTRACT

The present invention relates to a DC voltage converter with soft switching of the type with half-bridge arrangement at the primary side and of quasi-resonant half-wave type at the secondary side. This converter comprises a single transformer and can generate a plurality of regulated voltages at output. It furthermore comprises a resonant circuit for creating a half-wave resonant current in the secondary winding and charging a first load capacitor so as to produce a first DC voltage. It furthermore comprises an inductive circuit connected between said secondary winding and a second load capacitor able to generate a current so as to charge the second load capacitor during a part of the half-wave of the resonant current flowing in the secondary winding and thus produce a second DC voltage.

9 Claims, 4 Drawing Sheets

DC VOLTAGE CONVERTER WITH SEVERAL ISOLATED REGULATED OUTPUTS

This application claims the benefit, under 35 U.S.C. § 119 of French Patent Application 0550874, filed Apr. 4, 2005.

FIELD OF THE INVENTION

The present invention relates to a DC voltage converter with soft switching comprising a single transformer and able to generate at output a plurality of isolated regulated voltages. The invention applies to any type of application requiring several regulated voltages.

BACKGROUND OF THE INVENTION

There currently exist numerous arrangements for generating a plurality of isolated regulated output voltages from an input voltage. The first of them consists in using as many independent converters as regulated output voltages to be provided. Each converter generates a regulated output voltage from the unique input voltage and has, in order to generate this voltage, its own galvanic isolation component (transformer) and its own regulating loop. The cost of this arrangement is large, as are the proportions thereof, since it requires as many transformers as regulated output voltages. Moreover, the mutual synchronization of the various converters is tricky to achieve and requires the addition of further external components.

Another possible arrangement consists in wiring DC/DC converters that are preferably not isolated, up to the secondary side of a master converter that is isolated with transformer. The transformer of this master converter undertakes the galvanic isolation between the input voltage and the output voltages. The DC/DC converters are arranged in parallel on the output of the master converter. This arrangement becomes relatively complex when certain performances (low switch losses, synchronization of the DC/DC converters on the master converter) are sought.

Finally, another arrangement consists in using a single DC/DC converter comprising a single galvanic isolation transformer and in using, at the transformer level, as many secondary windings as regulated output voltages to be provided. For example, the transformer comprises a primary winding and two secondary windings, each secondary winding being used to produce a regulated output voltage. A switch is arranged in series with the primary winding. This switch is controlled by the output of a pulse width modulation circuit (PWM) receiving as input the voltage signal of one of the outputs of the converter. This device has the advantage of being simple to implement since it suffices to use as many windings at the secondary side of the transformer as regulated voltages desired, to rectify and filter each of them and to use one of them to slave the assembly. The problem with this arrangement is that only the output used for the slaving is perfectly regulated. The other outputs vary as a function of the loads present at their terminals and they have a tendency to increase at low load. The main drawback of this arrangement is therefore that it is rather ineffectual in terms of cross regulation between outputs.

SUMMARY OF THE INVENTION

The aim of the invention is to reduce all or some of these drawbacks.

The present invention relates to a DC voltage converter with soft switching, comprising a transformer having a primary winding and a secondary winding, the primary side of the converter being of the type with half-bridge arrangement and capable of being linked to an input voltage source by way of two switches and the secondary side of the converter being of quasi-resonant half-wave type and capable of providing at least one first DC voltage to a first load and one second DC voltage to a second load, said second DC voltage being less than said first DC voltage, first control means for controlling alternately the two switches, at fixed frequency, by pulse width modulation as a function of said first DC output and a resonant circuit for creating a half-wave resonant-current in the secondary winding and charging a first capacitor connected to the terminals of said first load so as to produce said first DC voltage, and in that it furthermore comprises an inductive circuit connected between said secondary winding and a second capacitor connected to the terminals of said second load, which inductive circuit is able to generate a current so as to charge said second capacitor during a part of the half-wave of the resonant current flowing in the secondary winding and produce said second DC voltage.

The inductive circuit more particularly comprises a first rectifying diode in series with a first inductance and a third switch, which third switch is closed during a part of the half-wave of the resonant current flowing in the secondary winding. Second control means are designed to control the third switch by pulse width modulation as a function of said second DC output.

According to a first embodiment, said resonant circuit comprises a second rectifying diode arranged in series with a second inductance and a resonance capacitor, the assembly being connected between the terminals of the secondary winding of the transformer, and the first capacitor is connected to the terminals of said resonance capacitor by way of a smoothing inductance.

According to a second embodiment, said resonant circuit comprises a second rectifying diode arranged in series with a second inductance between said secondary winding and the first capacitor, and a capacitor arranged in series with said primary winding which, reflected to the secondary side, is intended to resonate with said second inductance.

In both embodiments, the second inductance is the transformer's leakage inductance reflected to the secondary side or possibly the series inductance formed of the transformer's leakage inductance reflected to the secondary side and of an additional inductance arranged between the secondary winding and said first load.

BRIEF DESCRIPTION OF THE DRAWINGS

The invention will be better understood on reading the description which follows, given by way of nonlimiting example, and with reference to the appended drawings among which.

DETAILED DESCRIPTION OF PREFERRED EMBODIMENTS

According to the invention, the multiple regulated voltages are generated by a converter with soft switching operating with a current resonance at the secondary side. The resonant current at the secondary side is used to charge a capacitor arranged between the terminals of a first output delivering a first regulated voltage. The other regulated voltages are generated by post-regulating means connected to the terminals of the secondary winding of the converter.

The invention will be described through two exemplary embodiments represented in FIGS. 1 and 3. Of course, these two embodiments are given merely by way of exemplary embodiments. The post-regulating circuit proposed may be connected to any type of converter with soft switching operating with a current resonance at the secondary side.

In both these embodiments, the converter delivers a main regulated voltage Vs1 and a post-regulated voltage Vs2.

Figure 1:
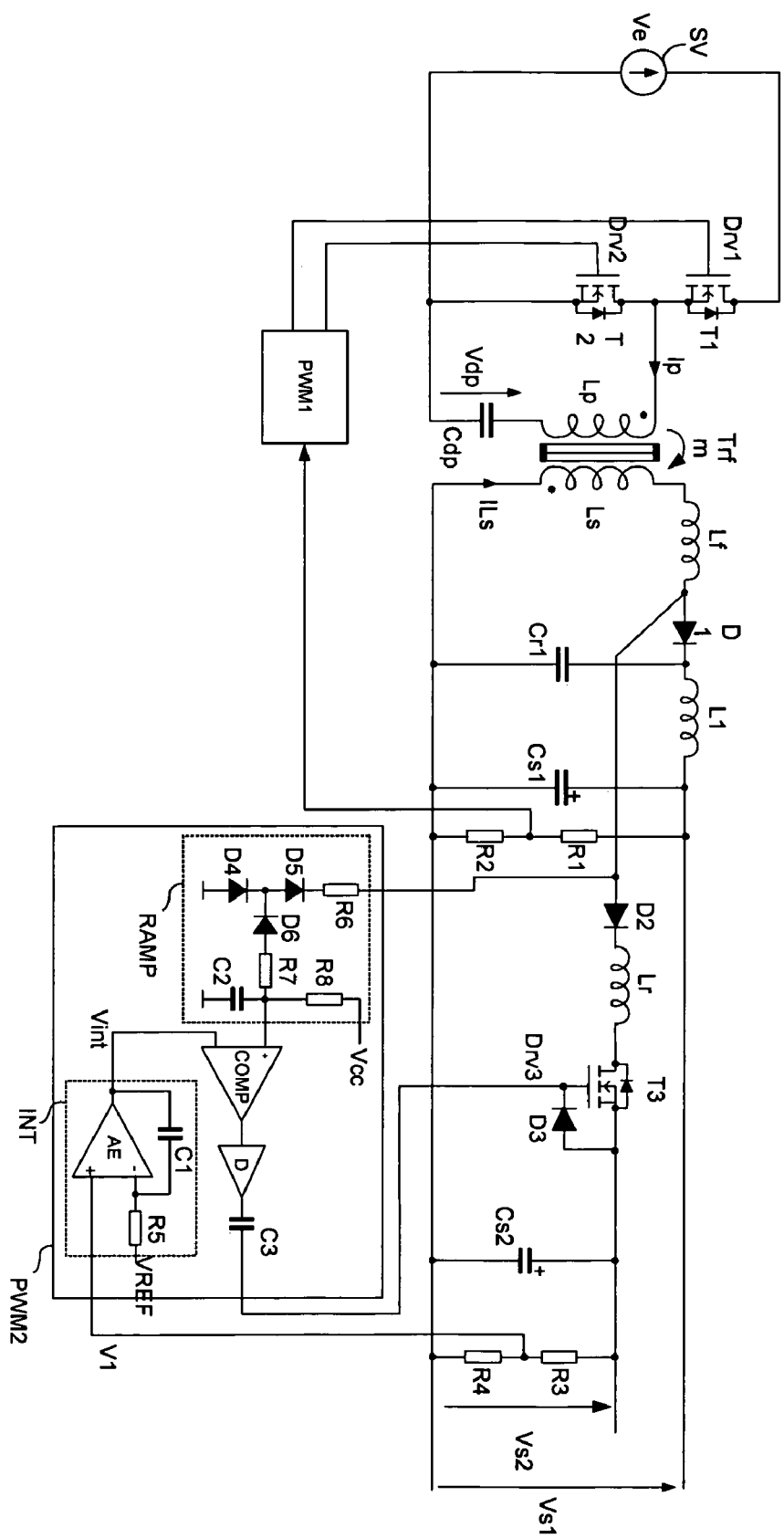
FIG. 1 is an electrical diagram of a first converter in accordance with the invention.

With reference to FIG. 1, the converter comprises an isolation transformer Trf with a half-bridge arrangement on the primary side and a quasi-resonant circuit with half-wave rectification at the secondary side. More precisely, the primary circuit comprises a half-bridge circuit with two switches T1 and T2 arranged in series between the terminals of a voltage generator SV delivering the input voltage Ve. The switches T1 and T2 are conventionally MOSFET transistors. The mid-point of the half-bridge circuit is connected to a first end corresponding to the dotted pin of the primary winding Lp of the transformer Trf. The other end corresponding to the undotted pin of the primary winding Lp is connected, via a capacitor Cdp having a high capacitance, to that terminal of the generator SV connected to the switch T2. The switches T1 and T2 are driven by the control signals Drv1 and Drv2 generated on the basis of a pulse width modulation circuit as a function of the output voltage Vs1 and the turns ratio m of the transformer Trf.

The undotted pin of the secondary winding Ls of the transformer Trf is linked by an inductance Lf and a rectifying diode D1, to a first end of a resonant capacitor Cr1, the other end of this capacitor being linked to the dotted pin of the secondary winding Ls. The inductance Lf corresponding to the leakage inductance of the transformer Trf as reflected to the secondary side is possibly supplemented with an additional inductance. A smoothing inductance L1 is connected between the inductance Lf-capacitor Cr1 junction and an end of the capacitor Cs1 placed between the terminals of a first output of the converter delivering the voltage Vs1. The other end of the capacitor Cs1 is connected to the dotted pin of the secondary winding Ls. The function of the inductance L1 is to smooth the current delivered by the output delivering the voltage Vs1. A bridge of resistors R1, R2 arranged in series between the terminals of this output is envisaged so as to provide a pulse width modulation control block PWM1 with a voltage representative of the voltage Vs1. This control block is of known structure and delivers the control signals Drv1 and Drv2. The structure of such a block is for example disclosed in patent application FR 2 738 417.

The manner of operation of this part of the converter is well known to the person skilled in the art. It is in particular described in patent application FR 2 738 417. The control signals Drv1 and Drv2 for the switches T1 and T2 are closed one after the other. A dead time is envisaged between the alternate actuations of these switches so that said transistors are in an open state on two occasions during the operating cycle of these two signals. The ratio of the on time of the switches T1 and T2 defines the output voltage Vs1. The manner of operation of this part of the converter is described later in detail with reference to FIGS. 2A to 2H.

To generate the voltage Vs2 on the basis of the voltage Vs1, post-regulating means are connected to the terminals of the series inductance formed of the secondary winding Ls and of the leakage inductance Lf. The inductance Lf—diode D1 junction is linked by a rectifying diode D2 to a first end of an inductance Lr, the other end of the inductance Lr being linked to a first end of a load capacitor Cs2 by way of a switch T3. The switch T3, which is conventionally a MOSFET transistor, is controlled so as to delay the appearance of a current in the inductance Lr. The other end of the capacitor Cs2 is connected to the dotted pin of the secondary winding Ls. When the switch T3 is closed, the voltage across the terminals of the inductance Lr is positive. The current crossing the inductance Lr increases until the voltage at the primary side is reversed. During the next period, the switch T3 is open when the current ILr reaches zero. This current, decreased by the mean current used by the load, ensures the regulation of the mean voltage Vs2 across the terminals of the capacitor Cs2 compared with the desired output value Vs2. The value of this voltage is driven directly by the phase delay supervision of the switch T3. A resistor bridge R3, R4 arranged between the terminals of this output is envisaged for providing a control block PWM2 with a voltage representative of the voltage Vs2. This block is charged with producing the control signal for the transistor T3. This signal is active during a part of the time of the current resonance of the secondary side of the converter.

The control block PWM2 essentially comprises an integrator circuit INT delivering a voltage representative of the mean difference between the measured value and the desired regulated value for Vs2, a circuit RAMP for generating a voltage ramp synchronized with the current crossing Ls, a comparator circuit COMP for comparing the voltage ramp and the output voltage of the integrator circuit, a power driver circuit D for delivering a current sufficient to charge the gate of the transistor T3 and a voltage shift circuit formed of a capacitor C3 and of a diode D3. The integrator circuit INT receives as input the voltage V1 present at the mid-point of the resistor bridge R3, R4 and a reference voltage VREF. The voltage V1 is applied to the positive input of a differential amplifier AE and the voltage VREF is applied to the negative input of the amplifier AE via a resistor R5. The negative input and the output of the amplifier AE are linked by a capacitor C1 in such a way as to thus obtain an integrator arrangement and to deliver a voltage Vint representative of the mean difference between the measured value and the desired regulated value for Vs2.

Additionally, the ramp circuit RAMP comprises two diodes D4, D5 and a resistor R6 that are arranged in series between the earth and the inductance Lf—diode D2 junction. The two diodes D4 and D5 are oriented so as to allow a current to flow towards the inductance Lf—diode D2 junction when they are on. The junction between the two diodes D4 and D5 is connected to a first end of a capacitor C2 via a diode D6 in series with a resistor R7. The other end of the capacitor C2 is connected to earth. The diode D6 is oriented so as to allow a current for discharging the capacitor C2. Finally, a resistor R8 is connected between a supply terminal Vcc and the resistor R7—capacitor junction so as to charge the capacitor C2 when the diode D6 is off. This ramp generator operates in the following manner: when the voltage at the inductance Lf—diode D1 junction is positive, the diodes D4, D5 and D6 are off and the capacitor charges up with a current provided by the resistor R8 which determines the positive slope of the ramp and, when the voltage at the inductance Lf—diode D1 junction is negative, the capacitor is discharged by means of D6 and R7, which resistor R7 determines the negative slope of the ramp.

The voltage Vint delivered by the integrator circuit INT is compared with the voltage ramp generated by the circuit RAMP by means of the comparator circuit COMP and the latter delivers a voltage signal of high level if VC2>Vint and a voltage signal of low level otherwise. This output signal is amplified by the driver circuit D so as to control the gate of the transistor T3. A capacitor C3 is inserted between the output of the driver circuit D and the gate of the transistor T3 so as to shift the voltage level applied to the gate of the transistor T3 so that the latter is greater than that of source of the transistor. This capacitor is charged to the voltage Vs2 by way of the diode D3 connected between the source and the gate of the transistor T3 when the output of the driver D is in the low state.

The overall manner of operation of the circuit is represented in FIGS. 2A to 2H.

Figure 2:
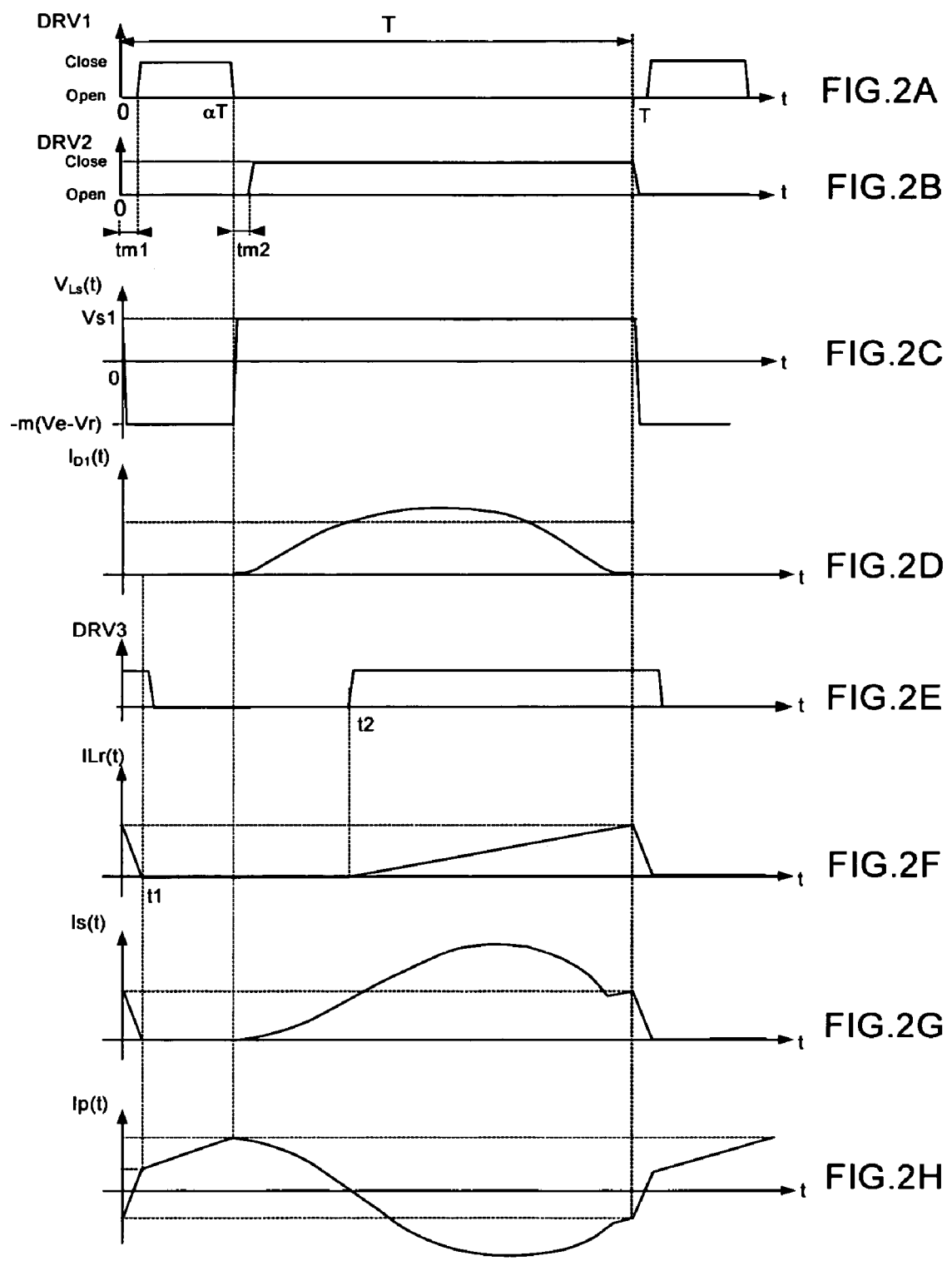
FIGS. 2A to 2H represent time charts of current and voltage illustrating the manner of operation of the converter of FIG. 1.

FIGS. 2A and 2B illustrate the shape of the control signals Drv1 and Drv2 for the switches T1 and T2. FIG. 2C represents the variations of the voltage $V_{LS}$ across the terminals of the secondary winding Ls. FIG. 2D represents the current $I_{D1}$ crossing the diode D1. FIGS. 2E and 2F represent respectively the control signal of the transistor T3 and the current flowing through the inductance Lr. FIGS. 2G and 2H represent the currents Is and Ip crossing respectively the winding Ls and the winding Lp. The current crossing Ls is the sum of the currents crossing the diode D1 and the inductance Lr.

In these figures, T represents the period of the opening/closing cycle of the switches T1 and T2. A dead time tm during which the two switches T1 and T2 are opened is envisaged between each switch closure. A first dead time tm1 is envisaged before the closure of the switch T1 and a second dead time tm2 is envisaged before the closure of the switch T2. The switch T1 is closed during the period of time [tm1, αT] and the switch T2 is closed during the period of time [αT+tm2, T]. During the remainder of the time, they are open.

In a general manner, the opening of the switches T1 and T2 is performed while the current in the primary side (resulting from the magnetizing current and the secondary current ILs reflected to the primary side) generates naturally the transitions of the primary voltage before one of said transistors becomes closed with a zero voltage between its terminals. This creates a soft switching of the switches and consequently a reduction of the switching losses.

During the time [tm1,αT], the switch T1 is closed. The input voltage Ve is applied to the terminals of the primary winding and of the capacitor Cdp. The diode D1 is then off. The current Ip through the primary winding Lp (=the magnetizing current flowing through the winding Lp of the transformer Trf engendered by the application of the voltage Ve across the terminals of the primary winding Lp and of the capacitor Cdp and increased by the mean output current reflected to the primary side in the turns ratio m) increases to a maximum value which is reached at the time αT. The switch T1 is then open, the switch T2 still being kept open. The current Ip is sufficiently significant at this juncture to cause the voltage across the terminals of the switch T2 to fall naturally and hence to ensure soft switching at zero voltage upon closure of the switch T2. The switch T2 is subsequently closed after the dead time tm2. The leakage inductance Lf subsequently starts resonating with the capacitor Cr1. A resonant current ID1 then flows through the diode D1. The current Ip through the primary winding then begins its decay following a sinusoid in phase opposition with that of the current $I_{D1}$. This decay is emphasized by the current of the inductive circuit reflected to the primary side. At the opening of the switch T2, the current Ip is high enough to make decrease the voltage at the terminals of the switch T1 and thus ensure a soft switching at zero voltage. The switch T1 is closed again for starting again a new operation cycle.

During the conduction phase of the switch T2, the switch T3 is controlled so as to delay the appearance of a current in the inductance Lr and thus to generate a voltage Vs2 less than Vs1. The transistor T3 is closed at a time t2 subsequent to αT. A positive voltage is applied to the terminals of the inductance which is therefore traversed by an increasing current ILr intended to charge the load capacitor Cs2. This increase in the current is interrupted when the voltage across the terminals of Ls inverts, that is to say when the switch T2 is opened and the switch T1 is closed at the primary side. The current ILr drops very rapidly since the inductance Lr is subjected to a very large negative voltage. The switch T3 is then opened when the current ILr has become zero. A regulated voltage Vs2 is thus obtained across the terminals of the capacitor Cs2.

The post-regulation is very easy to achieve since the switch T3 is subjected to very weak stresses since it is both closed and opened at zero current. The regulating of the output Vs2 is synchronous with the main converter.

Figure 3:
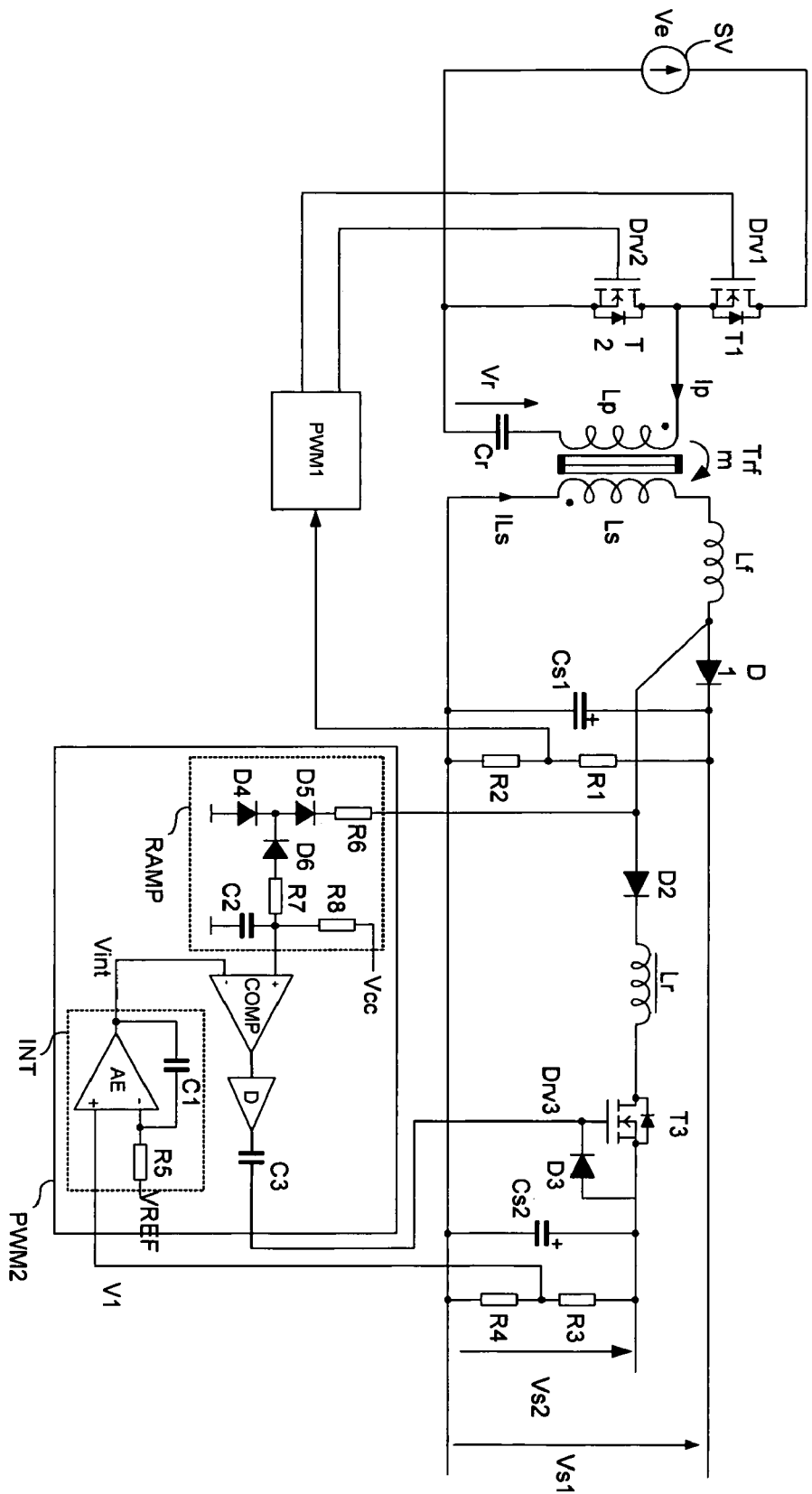
FIG. 3 is an electrical diagram of a second converter in accordance with the invention.

A second embodiment is proposed in FIG. 3. It relates to a converter that can operate in zero current mode or in interrupted secondary current mode during the switching of the switches.

The diagram of the converter of FIG. 3 differs from that of FIG. 1 both by the position of the resonant components and possibly by its mode of operation. In the circuit of FIG. 1, the leakage inductance Lf of the transformer Trf as reflected to the secondary side resonates with the capacitor Cr1 of low value. In the circuit of FIG. 3, the leakage inductance Lf resonates with a capacitor Cr positioned in place of the capacitor Cdp at the primary side-of the converter. The leakage inductance Lf resonates with the capacitor Cr reflected to the secondary side. The capacitors Cr1 and Cdp are removed and, as there is no longer any resonant capacitor at the secondary side, the smoothing inductance L1 is not relevant. The remainder of the diagram of FIG. 3 is identical to that of FIG. 1.

It is possible to operate this converter in the same way as that of FIG. 1, that is to say by switching the switches T1 and T2, the current Ip generating naturally the transitions of the primary voltage. However, according to an advantageous mode of operation, the switch T2 is open while the current $I_{D1}$ is not zero, what helps to ameliorate the soft switching at tm2 regardless of the output power. In this mode, provision is therefore made to interrupt the circuit generating VS1. Additionally, the post-regulating means for generating the additional regulated voltage operate in the same way as in the arrangement of FIG. 1.

The manner of operation of the converter of FIG. 3 according to the preferred embodiment described hereinabove is illustrated by FIGS. 4A to 4H.

Figure 4:
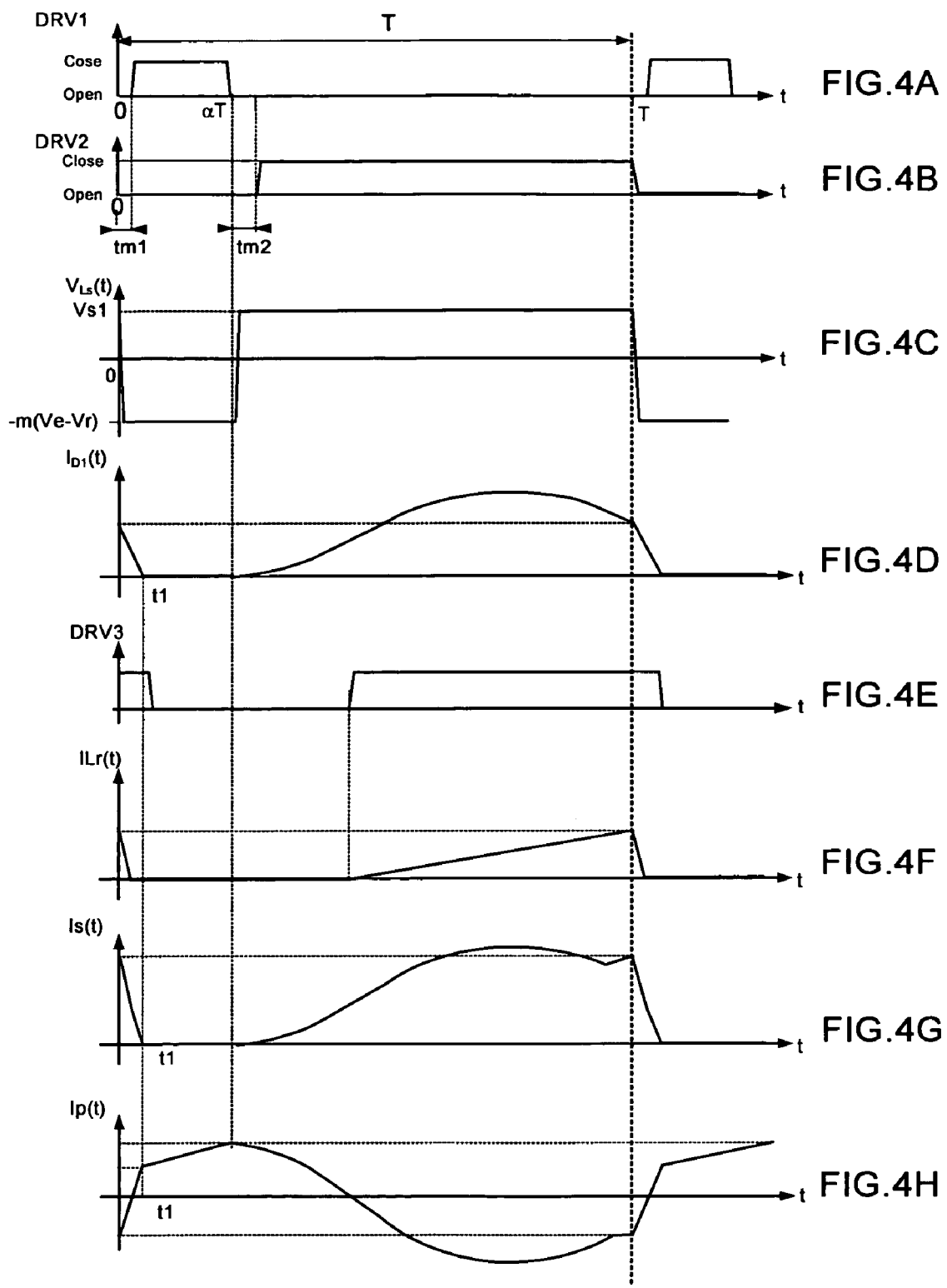
FIGS. 4A to 4H represent time charts of current and voltage illustrating the manner of operation of the converter of FIG. 3.

FIGS. 4A and 4B, identical to FIGS. 2A and 2B, illustrate the shape of the control signals Drv1 and Drv2 for the switches T1 and T2. FIG. 4C, identical to FIG. 2C, represents the variations of the voltage $V_{LS}$ across the terminals of the secondary winding Ls. FIG. 4D represents the current $I_{D1}$ crossing the diode D1. FIG. 4E represents the control signal Drv3 for the switch T3. FIG. 4F represents the current ILr crossing the inductance Lr. FIG. 4G represents the current Is crossing the secondary winding Ls and FIG. 4H represents the current Ip crossing the primary winding Lp.

This converter operates overall in the same way as the converter of FIG. 1 except for the fact that the switch T2 is open while the current $I_{D1}$ is not zero.

From the post-regulating point of view, this converter has the same advantages as that of FIG. 1.

Another mode of operation consists in connecting the inductive circuit (Lr,D2,T3), not to the resonant circuit using Lf, but to a part of the secondary winding Ls, notably when Vs2 is very low vesus Vs1, or to a particular isolated secondary winding.

The invention claimed is:

1. DC voltage converter with soft switching, comprising a transformer having a primary winding and a secondary winding, the primary side of the converter being of the type with half-bridge arrangement and capable of being linked to an input voltage source by way of two switches and the secondary side of the converter being of quasi-resonant half-wave type and capable of providing at least one first DC voltage to a first load and one second DC voltage to a second load, said second DC voltage being less than said first DC voltage, first control means for controlling alternately the two switches, at fixed frequency, by pulse width modulation as a function of said first DC output, wherein it comprises a resonant circuit for creating a half-wave resonant current in the secondary winding and charging a first capacitor connected to the terminals of said first load so as to produce said first DC voltage, and in that it furthermore comprises an inductive circuit connected between said secondary winding and a second capacitor connected to the terminals of said second load, which inductive circuit is able to generate a current so as to charge said second capacitor during a part of the half-wave of the resonant current flowing in the secondary winding and produce said second DC voltage.

2. Converter according to claim 1, wherein the inductive circuit comprises a first rectifying diode in series with a first inductance and a third switch, which third switch is closed during a part of the half-wave of the resonant current flowing in the secondary winding.

3. Converter according to claim 2, wherein the second control means are designed to control the third switch by pulse width modulation as a function of said second DC output.

4. Converter according to claim 1, wherein said resonant circuit comprises a second rectifying diode arranged in series with a second inductance and a resonance capacitor, the assembly being connected between the terminals of the secondary winding of the transformer, and in that said first capacitor is connected to the terminals of said resonance capacitor by way of a smoothing inductance.

5. Converter according to claim 4, wherein said second inductance is the leakage inductance of the transformer reflected to the secondary side.

6. Converter according to claim 5, wherein said second inductance is the series inductance formed of the leakage inductance of the transformer reflected to the secondary side and of an additional inductance arranged between the secondary winding and said second load.

7. Converter according to claim 1, wherein said resonant circuit comprises a second rectifying diode arranged in series with a second inductance between said secondary winding and the first capacitor, and a capacitor arranged in series with said primary winding which, reflected to the secondary side, is intended to resonate with said second inductance.

8. Converter according to claim 7, wherein said second inductance is the leakage inductance of the transformer reflected to the secondary side.

9. Converter according to claim 8, wherein said second inductance is the series inductance formed of the leakage inductance of the transformer reflected to the secondary side and of an additional inductance arranged between the secondary winding and said first load.

* * * * *